(12) United States Patent
Elovainio et al.

(10) Patent No.: US 7,645,843 B2
(45) Date of Patent: Jan. 12, 2010

(54) PROCESS FOR POLYMERISING OLEFINS IN THE PRESENCE OF AN OLEFIN POLYMERISATION CATALYST

(75) Inventors: Erno Elovainio, Helsinki (FI); Marianne Vuorikari, Hamari (FI); Esa Korhonen, Porvoo (FI); Pauli Leskinen, Helsinki (FI)

(73) Assignee: Borealis Technology Oy, Porvoo (FI)

( * ) Notice: Subject to any disclaimer, the term of this patent is extended or adjusted under 35 U.S.C. 154(b) by 12 days.

(21) Appl. No.: 11/667,635

(22) PCT Filed: Dec. 12, 2005

(86) PCT No.: PCT/EP2005/013315

§ 371 (c)(1),
(2), (4) Date: May 10, 2007

(87) PCT Pub. No.: WO2006/063771

PCT Pub. Date: Jun. 22, 2006

(65) Prior Publication Data

US 2007/0299220 A1     Dec. 27, 2007

(30) Foreign Application Priority Data

Dec. 17, 2004    (EP)    ................. 04078426

(51) Int. Cl.
*C08F 2/00*    (2006.01)
*B01J 8/00*    (2006.01)
*C08F 10/00*    (2006.01)

(52) U.S. Cl. .................... 526/88; 526/64; 526/919; 523/175; 502/109

(58) Field of Classification Search .............. 526/88, 526/919, 64; 523/175; 502/109
See application file for complete search history.

(56) References Cited

U.S. PATENT DOCUMENTS

| 3,262,922 | A |   | 7/1966  | Payne           |        |
|-----------|---|---|---------|-----------------|--------|
| 3,294,772 | A |   | 12/1966 | Cottle          |        |
| 4,121,029 | A |   | 10/1978 | Irvin et al.    |        |
| 4,433,123 | A |   | 2/1984  | Mack            |        |
| 4,613,484 | A |   | 9/1986  | Ayres et al.    |        |
| 4,675,368 | A | * | 6/1987  | Bienfait et al. | 526/75 |
| 4,758,089 | A |   | 7/1988  | Yokokura et al. |        |

(Continued)

FOREIGN PATENT DOCUMENTS

DE        248634        2/1911

(Continued)

OTHER PUBLICATIONS

Zwietering, Th. N., Article titled "*Suspending of solid particles in liquid by aditators*", Chemical Engineering Science, 1958, vol. 8, pp. 244-253.

(Continued)

*Primary Examiner*—Fred M Teskin
(74) *Attorney, Agent, or Firm*—Fay Sharpe LLP

(57) ABSTRACT

Olefins are polymerised in the presence of a solid catalyst component and optionally a cocatalyst. The solid catalyst component is introduced into the polymerisation reactor by suspending the solid component into oil having a viscosity of from 20 to 1500 mPa s. Optionally, the suspension comprises a drag reduction agent dissolved in the oil. The suspension is metered into the polymerisation reactor by using a valveless piston pump.

12 Claims, 2 Drawing Sheets

U.S. PATENT DOCUMENTS

| | | | |
|---|---|---|---|
| 5,641,721 A * | 6/1997 | Pentti et al. | 502/103 |
| 6,872,682 B1 * | 3/2005 | Alastalo et al. | 502/103 |
| 2003/0175185 A1 | 9/2003 | Kivela et al. | |
| 2004/0162400 A1 | 8/2004 | Eaton et al. | |

FOREIGN PATENT DOCUMENTS

| | | |
|---|---|---|
| EP | 0 099 774 | 10/1986 |
| EP | 0 071 454 | 12/1986 |
| EP | 0 022 376 | 3/1987 |
| EP | 0 249 689 | 3/1987 |
| EP | 0 517 183 | 12/1992 |
| EP | 0 428 056 | 1/1994 |
| EP | 0 459 218 | 8/1994 |
| EP | 0 472 491 | 2/1995 |
| EP | 0 491 566 | 10/1996 |
| EP | 0 688 794 | 8/1998 |
| EP | 0 713 888 | 1/1999 |
| EP | 0 560 312 | 7/1999 |
| EP | 0 823 919 | 9/1999 |
| EP | 0 815 929 | 8/2000 |
| EP | 1 415 999 | 5/2004 |
| EP | 1 125 626 | 11/2005 |
| GB | 1 532 332 | 11/1978 |
| WO | WO 91/16361 | 10/1991 |
| WO | WO 92/12181 | 7/1992 |
| WO | WO 92/12182 | 7/1992 |
| WO | WO 92/16747 | 10/1992 |
| WO | WO 92/19653 | 11/1992 |
| WO | WO 93/07182 | 4/1993 |
| WO | WO 93/13141 | 7/1993 |
| WO | WO 94/14857 | 7/1994 |
| WO | WO 95/12622 | 5/1995 |
| WO | WO 96/18662 | 6/1996 |
| WO | WO 96/32423 | 10/1996 |
| WO | WO 97/27225 | 7/1997 |
| WO | WO 97/36939 | 10/1997 |
| WO | WO 98/32776 | 7/1998 |
| WO | WO 98/58975 | 12/1998 |
| WO | WO 98/58976 | 12/1998 |
| WO | WO 99/51646 | 10/1999 |
| WO | WO 99/52951 | 10/1999 |
| WO | WO 99/58584 | 11/1999 |
| WO | WO 00/22011 | 4/2000 |
| WO | WO 01/05845 | 1/2001 |
| WO | WO 01/55230 | 8/2001 |
| WO | WO 03000754 | 1/2003 |
| WO | WO 03000756 | 1/2003 |
| WO | WO 03000757 | 1/2003 |
| WO | WO 03/037941 | 5/2003 |
| WO | WO 03/051934 | 6/2003 |
| WO | WO 2004/047638 | 6/2004 |
| WO | WO 2004/054700 | 7/2004 |

OTHER PUBLICATIONS

International Search Report for International Application No. PCT/EP/2005/013315.

* cited by examiner

PROCESS FOR POLYMERISING OLEFINS IN THE PRESENCE OF AN OLEFIN POLYMERISATION CATALYST

BACKGROUND OF THE INVENTION

1. Field of the Invention

The present invention deals with a process of producing olefin polymers in the presence of an olefin polymerisation catalyst. More specifically, the present invention deals with a method of transferring a solid polymerisation catalyst component into the polymerisation reactor. In particular, the solid catalyst component can be metered into the reactor with good accuracy without damaging the properties of the catalyst.

2. Description of Related Art

WO 9216747 discloses a device and a method for metering a viscous mixture of a wax and a polymerisation catalyst into the polymerisation reactor by using a valveless piston pump. It was disclosed that the catalyst—wax mixture having a viscosity of from 0.1 to 500000 mPa·s could be used. However, it was reported that the catalyst was mixed with a solution of polyethylene wax and liquid poly-alpha-olefin, where the viscosity of the polyethylene wax—poly-alpha-olefin mixture was 4500 mPa·s in the feed conditions.

WO 00/47638 discloses a method for polymerising olefins in the presence of a preactivated catalyst. The catalyst was mixed with oil and wax and metered into the polymerisation reactor by using a device disclosed in WO 9216747. The viscosity of the mixture was from 1 to 15 Pas, preferably from 4 to 10 Pas.

DE 248634 discloses a valveless piston pump capable for pumping viscous materials.

WO 01/05845 discloses a method for polymerising olefins in a fluidised bed gas phase reactor, where a solid catalyst component was mixed with oil having a viscosity of at least 50 mPa·s, preferably greater than 100 mPa·s but no greater than 5000 mPa·s. The catalyst slurry was mixed with aluminium alkyl compounds and passed through a static mixer, after which it was introduced into a fluidised bed polymerisation reactor.

EP 459218 discloses a shot-injector type of catalyst feeder, where catalyst slurry is allowed to settle so that the catalyst fills a bore of a feeder valve. When the valve turns the shot of settled catalyst is injected into the polymerisation reactor.

Solid catalyst components having small particle size, low density or high porosity have a tendency of settling slowly in a diluent. Therefore, if such catalysts are fed by using shot injector type of feeders as disclosed in EP 459218, the feed capacity is limited due to the low content of solid catalyst in the feed shots. This problem can be solved by mixing the catalyst into a viscous wax mixture, but the use of additional and viscous components requires special equipment.

SUMMARY OF THE INVENTION

One aspect of the present invention is to provide a polymerization process comprising the steps of:
(i) forming a catalyst slurry in a catalyst feed vessel comprising
  a. an oil, and
  b. a solid polymerization catalyst component;
(ii) maintaining the slurry in the catalyst feed vessel in a homogeneous state;
(iii) continuously withdrawing a portion of the catalyst slurry from the catalyst feed vessel and introducing the withdrawn slurry into a polymerization reactor;
(iv) continuously introducing at least one olefin monomer into the polymerization reactor;
(v) optionally, continuously introducing diluent and/or hydrogen into the polymerization reactor;
(vi) operating the polymerization reactor in such conditions that the at least one olefin monomer is polymerized
(vii) continuously or intermittently withdrawing the polymerized olefin from the polymerization reactor.

The process of the present invention comprises a process for olefin polymerisation, in which process at least one olefin monomer is polymerised in a polymerisation reactor in the presence of an olefin polymerisation catalyst. Said olefin polymerisation catalyst comprises at least a solid catalyst component comprising at least one transition metal compound.

In the process of the invention said solid catalyst component is suspended in oil to form catalyst slurry. Said catalyst slurry is maintained in homogeneous condition in a catalyst slurry vessel. A small portion of said slurry is continuously withdrawn from said catalyst slurry vessel and metered by using a catalyst slurry metering pump and introduced into a polymerisation reactor with a predefined rate.

The invention allows transferring different solid catalyst components whose particle size may vary over a wide range. Also, different types of catalysts supported on different types of supports may be used in the present invention. The invention is also suitable for transferring solid unsupported catalysts into a polymerisation reactor.

Especially, the method of the invention is useful in feeding catalysts having a small particle size into the polymerisation reactor. The catalysts can be fed into the polymerisation reactor with a high accuracy and no capacity problems, e.g. due to poor settling, are observed. The polymerisation can be conducted in stable conditions without fluctuations in the production rate due to inconsistent catalyst feed.

DETAILED DESCRIPTION OF THE DISCLOSURE

FIG. 1

Figure 1:
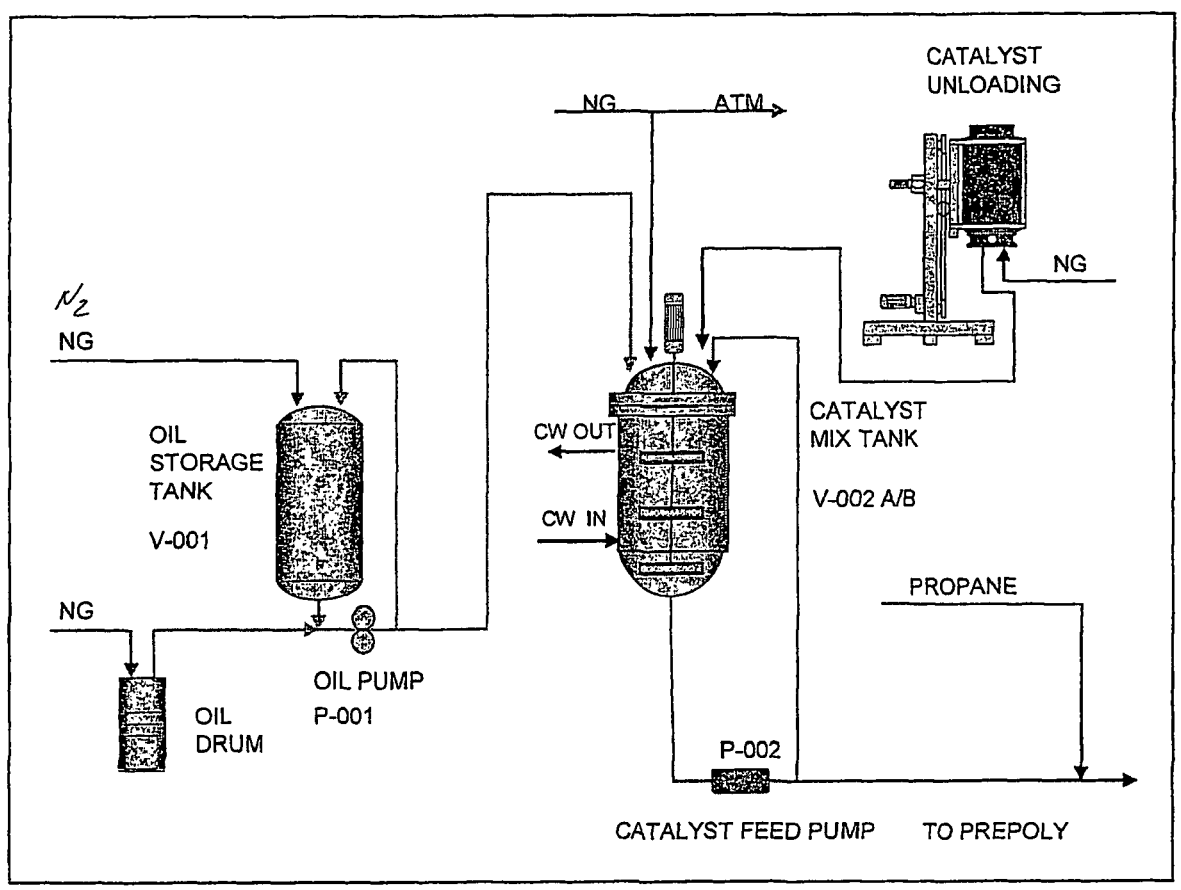
FIG. 1 shows one embodiment of the processes of the present disclosure.

FIG. 1 shows one arrangement to feed catalyst according to the present invention. The oil is transferred from the oil drums into the oil storage tank V-001 by using the oil pump P-001. Nitrogen lines (NG) are connected to both the oil drum and the oil storage tank to keep the oil under inert atmosphere. The oil is transferred from the oil storage tank into the catalyst mix tank V-002 by means of the oil pump P-001. The catalyst is transferred from the catalyst unloading station either in dry form or as slurry into the catalyst mix tank V-002. Nitrogen can also be lead into the catalyst unloading station and the catalyst mix tank. The catalyst mix tank V-002 is equipped with an agitator to keep the slurry as homogeneous and a cooling/heating jacket to keep the temperature constant. The catalyst slurry is continuously metered from the catalyst mix tank into the prepolymerisation reactor by using the catalyst feed pump P-002. The catalyst slurry is combined with the diluent stream and transferred into the reactor.

Preferably, for unloading the transport barrels from the unloading station into the catalyst mix tank, the transport barrel is first tumbled in a drum tumbler in three dimensions.

This ensures that no cake of catalyst shall remain in the transport barrel. This kind of tumbling is more effective than rolling.

When the barrel has been properly tumbled, e.g. for about 30 minutes to two hours, it is connected to a pipeline, through which the catalyst slurry is taken into the catalyst mix tank by using pressurised oil. The advantage is then that it is not necessary to carry the barrel to a high level where the catalyst feeder may be located, but the operations may be carried out at a ground level.

FIG. 2

Figure 2:
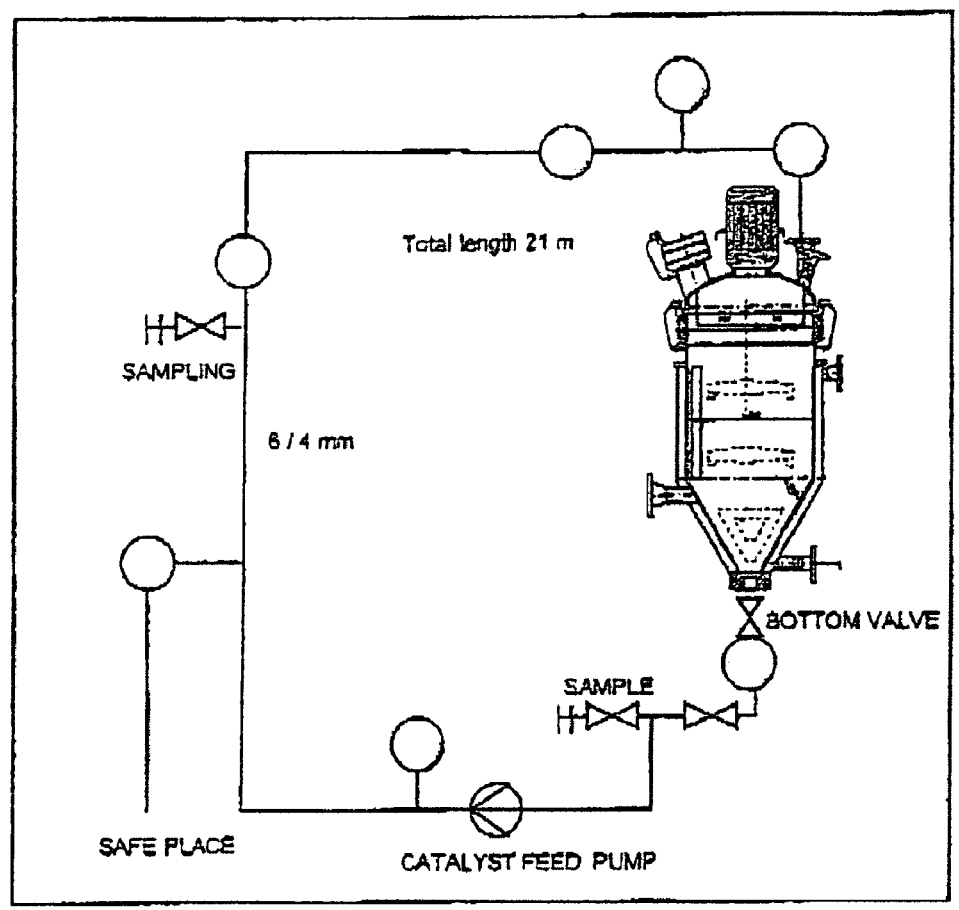
FIG. 2 shows a testing arrangement used in the Examples of the present disclosure.

FIG. 2 shows a test arrangement that was used to test the functionality of the present concept. The arrangement includes a catalyst mix tank, which is equipped with an agitator and a cooling/heating jacket. The catalyst slurry is prepared into the mix tank and recycled by using the catalyst feed pump from the bottom of the catalyst mix tank to an opening at the upper part of the mix tank.

DETAILED DESCRIPTION OF THE INVENTION

Catalyst Slurry

According to the invention, the solid catalyst component is suspended in oil to produce catalyst slurry. The catalyst slurry is maintained in homogeneous state and a portion of the slurry is continuously withdrawn from the catalyst slurry vessel and introduced into a polymerisation reactor. Optionally, the catalyst slurry is contacted with an activator and/or an electron donor before it is introduced into the polymerisation reactor.

Solid Catalyst Component

Any solid catalyst component may be used in the method of the invention. Thus, the catalyst may be of Ziegler-Natta type. For example, it may contain a magnesium compound and a titanium compound supported on an inorganic oxide carrier, as disclosed in EP 688794, WO 91/16361, WO 93/13141, WO 94/14857, WO 99/51646 and WO 01/55230. However, it may also contain a titanium compound supported on halide, as disclosed in WO 03/000756, WO 03/000757, WO 03/000754, WO 92/19653, WO 93/07182, WO 97/36939 and WO 99/58584. The catalyst may also be unsupported comprising particles of solid titanium trichloride, optionally containing additional components, such as aluminium trichloride.

The catalyst may also be a chromium catalyst, typically supported on silica. Such catalysts are disclosed, among others, in WO 99/52951 and WO 97/27225.

Further still, the catalyst may be a metallocene catalyst. Often such catalysts are supported, preferably on an inorganic oxide carrier, as disclosed in WO 95/12622, WO 96/32423, WO 98/32776 and WO 00/22011. However, the catalyst may also be prepared by forming the support from alumoxane and incorporating the metallocene compound on the alumoxane. Such a method of preparing solid metallocene catalyst components is disclosed in WO 03/051934.

The solid catalyst component may comprise polymer. Thus, it may have been prepolymerised to produce a minor amount of polymer on the solid catalyst component, for instance from 0.01 to 50 grams of polymer per gram of the solid component. The monomer used for prepolymerisation may be the same as used in the polymerisation reactor, or it may be different therefrom.

The solid catalyst component may be delivered as a dry powder, or it be delivered in oil slurry. If the catalyst is delivered as slurry, the oil used in the slurry is preferably the same as or at least similar to the oil used in the catalyst feed.

The concentration of the solid catalyst component in the transport slurry may be up to 450 kg/m$^3$.

The concentration of the solid catalyst component can be selected freely so that the desired catalyst feed rate is conveniently obtained. However, said concentration must not be too high, as otherwise it may be difficult to maintain stable slurry. On the other hand, too low concentration may result in using excessive amount of oil, which may cause problems in increasing the level of extractable matters in the final polymer product. It has been found that suitable catalyst concentration is from 50 to 500 kg/m$^3$, preferably from 100 to 400 kg/m$^3$ and in particular from 150 to 300 kg/m$^3$, based on the volume of the slurry.

Oil

The oil to be used must be inert towards the catalyst. This means that it must not contain components having tendency to react with the catalyst, such as groups containing atoms selected from oxygen, sulphur, nitrogen, chlorine, fluorine, bromine, iodine and so on. Also groups containing double bonds or triple bonds should be avoided. Especially the presence of compounds like water, alcohols, organic sulphides, ketones, carbon monoxide, carbon dioxide and acetylenic compounds should be avoided.

Preferably the oil is hydrocarbon oil or silicon oil, more preferably hydrocarbon oil, containing less than 100 parts per million (ppm) of compounds containing said groups. More preferably, the content of such compounds is less than 50 ppm and in particular less than 10 ppm. Examples of suitable oils are mineral oils and synthetic oils comprising essentially of hydrocarbons containing from about 15 to about 50 carbon atoms; Synton PAO 100™, which is a synthetic oil supplied by Crompton Petroleum Additives; Shell Cassida HF 15™, Shell Cassida HF 32™, Shell Cassida 46™, Shell Cassida HF 68™ and Shell Cassida HF 100™, which are synthetic oils supplied by Shell; Drakeol 35™, which is a synthetic oil supplied by Penreco; Ondina 68™, which is a mineral oil supplied by Shell and Primol 352™, which is supplied by ExxonMobil.

The viscosity of the oil should be such that stable slurry is obtained and the tendency of the catalyst particles to settle is minimal. Therefore, the oil should not have a too low viscosity. On the other hand, the slurry should be readily transportable into the polymerisation reactor. A very high viscosity causes problems in catalyst handling, as highly viscous fluids need special operations in their handling. Moreover, the viscous wax remaining in the polymer product after the polymerisation may have a negative effect on the product properties.

It has been found that best results are obtained if the dynamic viscosity of the oil is from 20 to 3000 mPa·s at the operating temperature of the catalyst feed vessel. Preferably the dynamic viscosity is from 20 to 1500 mPa·s, more preferably from 30 to 990 mPa·s, when measured at the operating temperature of the feed vessel. Especially, the viscosity of the oil should be sufficiently high to allow the operation of the feed pump. Moreover, the oil should lubricate the piston of the catalyst feed pump, to allow its smooth operation.

It has been surprisingly found that when the viscosity is selected within the range discussed above, the components of the catalyst slurry can be easily handled in various process operations, the catalyst particles have a minimal tendency to settle during their residence in the feed vessel and piping and a smooth operation of the feed pump is ensured.

Additional Components

Additionally, the catalyst slurry may contain additional components, such as activators, electron donors, modifiers, antistatic agents and so on. If such components are used, they may be combined with the catalyst slurry in the slurry vessel, or they may be combined with the catalyst slurry stream to be introduced into the polymerisation reactor, or they may be introduced directly into the polymerisation reactor without precontacting them with the catalyst slurry.

Of useful activators can be mentioned the organometal compounds, such as the organoaluminium compounds and in specific the aluminium alkyls. Examples of such preferred compounds are trimethylaluminium, triethylaluminium, tri-isobutylaluminium, tri-n-hexylaluminium, tri-n-octylaluminum and isoprenyl aluminium. Other useful compounds are methylalumoxane, tri-isobutylalumoxane, hexa-isobutylalumoxane and other alumoxanes, dimethylaluminium chloride, diethylaluminium chloride, methylaluminium sesquichloride, ethylaluminium sesquichloride, diethyl zinc and triethyl boron.

As examples of electron donors, ethers, esters, ketones, alcohols, carboxylic acids, silicon ethers, imides, amides and amines may be mentioned.

It is further possible to add into the catalyst slurry a small amount of a drag reducing agent. Such drag reducing agents are typically soluble polymers of high alpha-olefins, like $C_6$ to $C_{15}$ alpha-olefins, preferably $C_8$ to $C_{13}$ alpha-olefins, and their mixtures. They may comprise a minor amount of comonomer units derived from other olefins as well. It is important, however, that the drag reducing agent is soluble in the oil. The drag reducing agent is used in an amount of 0.1 to 1000 ppm, preferably 0.5 to 100 ppm and more preferably 1 to 50 ppm by weight of the catalyst slurry. It has been found that already this small amount reduces the settling tendency of the slurry. While an excess amount of the drag reducing agent has no drawback from the process point of view, it should be borne in mind that the drag reducing agent shall remain with the polymer product and it may have a negative effect in some product properties if used in large quantities.

Drag reducing agents are available on the market and they are supplied, among others, by M-I Production Chemicals and Conocon. The former supplies a product with a trade name NECADD 447™, which has been found to be useful in preventing the settling of the catalyst particles. The drag reducing agent typically has a weight average molecular weight of at least 250000 g/mol, preferably at least 500000 g/mol and more preferably at least 800000 g/mol. In particular, the drag reducing agent has a weight average molecular weight of more than 1000000 g/mol. The high molecular weight corresponds to a high inherent viscosity. Preferably, the drag reducing agent has an inherent viscosity of at least 10 dl/g measured using a Cannon-Ubbelohde four bulb shear dilution viscometer (0.1 g polymer/100 ml toluene at 25° C.).

It has been surprisingly found that when a drag reducing agent is added into the catalyst slurry, it delays the settling process and prevents the catalyst particles from agglomerating. For this reason, the drag reducing agent can be advantageously used to improve the transport and storage stability of the slurry. If the catalyst were transported and stored in slurry, the drag reducing agent may be added into the slurry when it is loaded into transportation drums. In this way sedimentation of the catalyst during transport and storage can be avoided. The addition of the drag reducing agent is especially useful when transporting, storing and feeding solid catalyst components having a small particle size. Also it has been surprisingly found that the drag reducing agent, if used in the amounts disclosed above, has no, or a negligible effect on the viscosity of the oil and no negative effect on the handling properties of the slurry.

In some embodiments, the catalyst slurry comprises (i) from 10 to 30% by weight of the total composition, a solid catalyst component; (ii) from about 70 to about 90% by weight of the total composition, an oil having a viscosity of 20 to 1500 mPa·s, preferably 30 to 990 mPa·s; and (iii) from 0.1 to 1000 part per million, based on the weight of the total composition, a drag reducing agent, dissolved in said oil, which drag reducing agent is either a polymer comprising a majority of units derived from $C_6$ to $C_{15}$ alpha-olefins and/or an olefin polymer having an inherent viscosity of at least 10 dl/g.

Catalyst Feed

The process of introducing the catalyst into the polymerisation reactor comprises the following steps:
(i) forming a catalyst slurry comprising
  a. an oil, and
  b. a solid catalyst component
(ii) maintaining the slurry in a homogeneous state in a catalyst feed vessel
(iii) continuously withdrawing a portion of the catalyst slurry from the catalyst feed vessel and introducing the withdrawn slurry into a polymerization reactor.

The catalyst slurry may be formed in any method known in the art. According to a preferred method, the solid catalyst component is introduced into the oil under agitation. The slurry may be prepared in the catalyst feed vessel or it may be prepared in advance and then transferred into the catalyst feed vessel. Further, the solid catalyst component may also be delivered into the feed vessel as concentrated slurry, which may then be diluted with oil in the feed vessel.

The homogeneous slurry is maintained by agitation. The agitation can be obtained by circulating the slurry by using a circulation pump and pipes connecting the pump to the catalyst feed vessel. Alternatively, the catalyst feed vessel is equipped with an agitator, which keeps the slurry within the feed vessel in motion. Preferably the catalyst feed vessel is equipped with an agitator. The elements of the agitator should be chosen so that uniform stirring in the whole volume of the catalyst feed vessel is obtained and no dead spots where the catalyst could settle exist. These stirrer elements, such as anchor type elements and axial and radial impellers are well known in the art and a person skilled in the art can choose a suitable combination for each geometry of the catalyst feed vessel. The catalyst feed vessel may also be equipped with baffles, which are known in the art to further improve the stirring. As known to those familiar with the art, the revolution speed of the agitator N should be selected so that $N \geq N_{js}$, where $N_{js}$ is the just suspended speed and which can be calculated from correlations available in the art, for instance in Zwietering Th. N., "Suspending of solids particles in liquid by agitators", Chem Eng Sci, Vol 8, pp 244 . . . 254, 1958.

The temperature of the slurry within the catalyst feed vessel is not critical. However, too low and too high temperatures should be avoided, as otherwise the viscosity of the slurry might either become too high so that it cannot be conveniently handled in the process or too low so that the particles tend to settle. The temperature may be selected from the range of from −30° C. to +80° C., preferably from 0° C. to 60° C. It is preferred to equip the catalyst feed vessel with a heating/cooling jacket so that the temperature in the vessel can be maintained within the desired level. Especially, the temperature of the slurry should be adjusted so that the viscosity of the oil would be within the desired limits. Moreover, temperature variations should be avoided; they cause variations in the density of the slurry. If the density of the slurry varies, then the catalyst feed rate shall vary accordingly and this could cause fluctuations in the polymerisation process.

The pressure within the catalyst feed vessel is not critical, either. It can be selected within the operating range of the process equipment. Especially, it should be selected so that the pumps can be operated without problems. It is desired that the pressure in the catalyst feed vessel is higher than the atmospheric pressure to minimise the eventual leaks of air and/or moisture into the catalyst feed vessel.

The catalyst feed vessel must be maintained in inert atmosphere. Especially, the presence of oxygen and moisture should be avoided. Therefore, all the connections to the vessel, such as pipe joints and agitator shaft bearing need to be carefully designed to eliminate the leaks from the atmosphere. Also, the process chemicals, such as the lubricating oil for the bearings, needs to be selected so that they do not contain components that are harmful for the catalyst, or alternatively, their carryover into the catalyst feed vessel needs to be prevented. It is especially preferred to use as the lubricating oil the same oil that is used as a diluent in the catalyst slurry.

The gas phase in the catalyst feed vessel should preferably consist of nitrogen, argon and similar inert gases, or their mixtures. Also, the catalyst feed vessel should be equipped with possibility to flush the vessel with inert gas, preferably with nitrogen.

A portion of the homogeneous slurry is continuously withdrawn from the feed vessel and introduced into a polymerisation reactor. The slurry is metered into the reactor by using a metering pump. The metering pump may be any pump that is capable of metering slurries with the specified viscosity in the required amount. One pump that has been found as especially useful in the process of the invention is a valveless piston pump. Examples of such pumps and their use are given in WO 92/16747, WO 00/47638 and DE 248634.

The catalyst feed line may be equipped with a catalyst flow meter. Flow meters suitable for measuring the catalyst feed rate are disclosed in PCT patent application PCT/EP03/15031, or are commercially available, among others, from Oxford Instruments. Such a flow meter may also be used as a part of a control loop to control the catalyst feed rate. For example, a signal from the flow meter is compared with a predetermined set value, and the signal to the metering pump is adjusted based on the difference.

When the activator and/or electron donor is used, it may be mixed with the catalyst slurry in different ways. One alternative is to introduce the activator and/or electron donor to the catalyst feed vessel. Another alternative is to combine the activator and/or the electron donor with the catalyst slurry in the catalyst feed line. A third alternative is to introduce the activator and/or the electron donor directly into the polymerisation reactor. In addition, in some cases it may be beneficial to use a combination of two of the three methods discussed above or a combination of all of them.

In some cases it is beneficial to combine the catalyst slurry with the activator and/or the electron donor in the catalyst feed line. Then it is possible to add the activator feed stream and/or the electron donor feed stream directly to the catalyst slurry feed stream and allow the activator and/or the electron donor to contact with the catalyst in the feed line. It is also possible to contact the catalyst slurry, the activator and/or the electron donor in a static mixer. This produces an intimate contact with the catalyst components and is recommended where it is essential to activate the catalyst prior to the introduction into the polymerisation reactor. Static mixers are generally known in the art. More information on static mixers is given, among others, in EP 1125626, EP 815929, EP 472491, U.S. Pat. No. 4,758,089 and EP 71454. Their use in catalyst feed is discussed, for instance, in WO 01/05845 and EP 823919. Static mixers are supplied, among others, by Sulzer and Chemineer.

The proposed method of feeding the catalyst is especially useful for catalysts having high activity. The catalysts suitable for being fed using the method of the invention preferably have a productivity in the polymerisation step of more than 3 kg polymer/g catalyst, more preferably of more than 5 kg/g catalyst, and especially preferably of more than 10 kg/ g catalyst and in particular more than 15 kg/g catalyst. When the activity of the catalyst is high, the feed rate of the catalyst slurry can be maintained at a low level. Then the residues of the oil in the final polymer are smaller.

Polymerisation Process

Another aspect of the present invention is to provide a polymerization process comprising the steps of:
(i) forming a catalyst slurry in a catalyst feed vessel comprising
   a. an oil, and
   b. a solid polymerization catalyst component;
(ii) maintaining the slurry in the catalyst feed vessel in a homogeneous state;
(iii) continuously withdrawing a portion of the catalyst slurry from the catalyst feed vessel and introducing at least the withdrawn catalyst slurry into a polymerization reactor;
(iv) continuously introducing at least one olefin monomer into the polymerization reactor;
(v) optionally, continuously introducing diluent and/or hydrogen into the polymerization reactor;
(vi) operating the polymerization reactor in such conditions that the at least one olefin monomer is polymerized
(vii) continuously or intermittently withdrawing the polymerized olefin from the polymerization reactor.

The polymerisation may be conducted in any method that is known in the art, such as in slurry, solution or gas phase. As the method of the invention does not cause notable attrition and disintegration of the catalyst particles during the catalyst feed, it is particularly suitable for particle forming processes, such as slurry or gas phase.

In some cases it is preferred that the polymerisation stage is preceded by a prepolymerisation stage. In prepolymerisation a small amount of an olefin, preferably from 0.1 to 500 grams of olefin per one gram catalyst is polymerised. Usually the prepolymerisation takes place at a lower temperature and/or lower monomer concentration than the actual polymerisation. Typically, the prepolymerisation is conducted from 0 to 70° C., preferably from 10 to 60° C. Usually, but not necessarily, the monomer used in the prepolymerisation is the same that is used in the subsequent polymerisation stage(s). It is also possible to feed more than one monomer into the prepolymerisation stage. Description of prepolymerisation can be found in e.g. WO 96/18662, WO 03/037941, GB 1532332, EP 517183, EP 560312 and EP 99774.

In the polymerisation process alpha-olefins of from 2 to 20 carbon atoms can be polymerised. Especially ethylene and/or propylene, optionally together with higher alpha-olefins are polymerised. The polymers obtained from the process include all the olefin polymers and copolymers known in the art, such as high density polyethylene (HDPE), medium density polyethylene (MDPE), linear low density polyethylene (LLDPE), polypropylene homopolymers, random copolymers of propylene and ethylene or propylene and higher alpha-olefins, heterophasic copolymers of propylene and ethylene, poly-1-butene and poly-4-methyl-1-pentene. When higher alpha-olefins are used as comonomers, they are preferably selected from the group consisting of 1-butene, 1-hexene, 4-methyl-1-pentene, 1-octene and 1-decene.

It is within the scope of the invention to conduct the polymerisation in at least one polymerisation stage. It is also known in the art to polymerise in at least two polymerisation stages to produce bimodal polyolefins, such as bimodal polyethylene and bimodal polypropylene, as disclosed in WO 92/12182, EP 22376, EP 713888 and WO 98/58975. Further, multistage polymerisation may be used to produce heterophasic propylene copolymers, as disclosed in WO 98/58976. It is to be understood that the present invention is not limited to any specific number of polymerisation stages, but any number is possible.

If the polymerisation is conducted as a slurry polymerisation, any suitable reactor type known in the art may be used. A continuous stirred tank reactor and a loop reactor are suitable examples of useful reactor types. Especially, a loop reactor is preferred because of its flexibility.

The slurry polymerisation may be conducted in normal liquid slurry conditions or alternatively so that the temperature and the pressure within the reactor exceed the critical temperature and pressure of the fluid mixture within the reactor. Such a polymerisation method is called supercritical slurry polymerisation. Description of liquid slurry polymerisation is given, among others, in EP 249689 and U.S. Pat. No. 3,262,922 and supercritical slurry polymerisation in WO 92/12181 and U.S. Pat. No. 3,294,772.

The slurry may be withdrawn from the reactor in any method known in the art, including continuous and intermittent withdrawal. If the withdrawal is intermittent, it may be realised by using so called settling legs, where the slurry is allowed to settle before discharging the settled slurry from the reactor. Settling legs are generally known in the art and they are described, for instance, in U.S. Pat. No. 4,613,484 and U.S. Pat. No. 4,121,029.

If the slurry is withdrawn continuously from the reactor, then it may be withdrawn without a concentration step or it may be concentrated either before or after the withdrawal. For economical reasons it is preferred to concentrate the slurry. Suitable methods of concentration are, among others, hydrocyclone or sieve. Typically in such a method the slurry is withdrawn continuously from the reactor and passed through a concentration device, such as hydrocyclone or sieve. The bottom flow is directed to product withdrawal whereas the overflow is recycled to the polymerisation reactor. Such methods are disclosed in EP 1415999.

One advantage of the method of the invention is that if combined with a continuous product withdrawal, it allows a truly continuous operation of the process. As both the catalyst feed and the product withdrawal are continuous, the polymerisation process is less likely to be disturbed by catalyst feed batches or product outtake batches. The process can be operated in a more stable fashion and this leads to problem-free and stable production.

The present invention has also advantages over similar types of arrangements, where the catalyst is mixed with oil and a viscous wax. The present system is simpler, as it only contains one component to mix the catalyst with. Also, the present invention surprisingly produces more stable catalyst feed than the oil-wax mixture. Further still, it has been surprisingly been found that the activity of the catalyst is higher when using the feed arrangement according to the present invention. While the reason for the increased activity is not completely clear, it is believed that the highly viscous wax plugs the pores of the catalyst, thus creating a diffusion barrier.

A further advantage of the present invention over using a mixture of oil and wax is the improved safety in catalyst handling operations. The catalyst slurry can be produced at a lower temperature than the wax mixture. Also, there are less treatment steps and the process is thus simpler.

Description of Analytical Methods

Kinematic Viscosity
Kinematic viscosity of the oil was measured according to ISO 3104.

Density
Density of the oil was measured according to ISO 12185.

Dynamic Viscosity
Dynamic viscosity of the oil was obtained as the product of the kinematic viscosity and the density.

Molecular Weight
Average molecular weights and molecular weight distribution were determined by size exclusion chromatography (SEC) using Waters Alliance GPCV2000 instrument with on-line viscometer. Oven temperature was 140° C. Trichlorobenzene was used as a solvent.

Melt Flow Rate
Melt flow rate of the polymer was determined according to ISO 1133 at 190° C. under a load of 2.16 kg ($MFR_2$).

Density
Density of the polymer was determined according to ISO 1183-1987.

EXAMPLE 1

A catalyst supplied by Engelhard under the trade name Lynx 200™ was used as a polymerisation catalyst. 30.1 kg of this catalyst was suspended in 102.9 kg of Drakeol 35 oil, supplied by Penreco, to produce a catalyst slurry containing 22.6 % by weight solids. The temperature of the slurry was maintained at about 40° C. The catalyst was metered into a prepolymerisation reactor having a volume of 11 $m^3$ by Orlita DR 15/12 non valve piston pump, where ethylene was homopolymerised in propane diluent at 60 bar pressure and at the temperature of 40° C. The kinematic viscosity of the oil was 66 cSt and the density 865 kg/$m^3$. The dynamic viscosity was thus 57 mPa·s.

The feed rate of the catalyst slurry was such that approximately 0.3 kg/h of solid catalyst component was introduced into the prepolymerisation reactor. In addition to the solid catalyst component, about 5 kg/h of a solution of 10% by weight of triethylaluminium in pentane was introduced into the reactor. Ethylene, propane diluent and hydrogen were fed into the reactor in such amounts that the ethylene concentration was 1.6% by mole and the hydrogen to ethylene ratio was 50 mol/100 mol. The resulting polymer had a melt flow index $MFR_2$ of 20 g/10 min and density of 960 kg/$M^3$. The production rate was 0.36 tons/h. The polymer slurry was continuously withdrawn from the prepolymerisation reactor and introduced into a loop reactor where additional propane diluent, ethylene and hydrogen were introduced so that the ethylene concentration was about 7% by mole and the molar ratio of hydrogen to ethylene was about 700 mol/kmol. The temperature in the loop reactor was 95° C. and the pressure 59 bar. The polymer production rate in the loop reactor was about 7.5 tons/h and the polymer had a melt index $MFR_2$ of about 300 g/10 min and a density of about 975 kg/$M^3$. The polymer slurry was continuously withdrawn from the loop reactor, after which the hydrocarbons were removed and the polymer was transferred to a gas phase reactor for subsequent polymerisation by adding ethylene, hydrogen and 1-butene comonomer.

The operation of the prepolymerisation reactor, loop reactor and gas phase reactor was stable without problems. The process could be operated for several weeks without problems.

EXAMPLE 2 (COMPARATIVE)

The procedure was the same as in Example 1 but the catalyst slurry contained 7% by weight heptane. The catalyst amount was 30.0 kg, oil 93.7 kg and heptane 9.3 kg. Catalyst solid concentration was 22.5 % by weight. The dynamic viscosity of the oil/heptane solution was about 15 mPa·s.

Catalyst feed was not stable and this caused the reaction in the prepolymerisation reactor and the loop reactor to become unstable. Finally too low viscosity of the oil-heptane solution caused propane to flow backwards through the feed pump into the catalyst feed vessel and the process had to be shut down.

EXAMPLE 3 (COMPARATIVE)

The procedure was the same as in Example 1 but the catalyst slurry was fed in gel thickened mineral oil i.e. wax. The catalyst amount was 20.0 kg and wax 113.3 kg. The suspension contained: Catalyst 14.8 wt-%, Drakeol 21.3 wt-% Petrolatum (wax) 63.9 wt-%. The dynamic viscosity of the mixture was 3500 m Pas.

Catalyst feed was not that stable as in Example 1. One third of the catalyst mixture didn't come out from the Catalyst Mix Tank. A thick layer of the catalyst wax mixture remained on the wall of the Catalyst Mix Tank.

EXAMPLE 4 (COMPARATIVE)

A catalyst supplied by Engelhard under the trade name Lynx 200™ was used as a polymerisation catalyst. The catalyst feed arrangement was as described in EP 428056. The feeder works with shot injector principle and catalyst has to settle into the feed valve before each shot.

Catalyst feed was unstable and there were big fluctuations in the prepolymerisation reactor and in the loop reactor. The process could be operated only for some hours before it had to be shut down due to a blockage in the catalyst feed and in the prepolymerisation reactor.

EXAMPLE 5

Arrangement shown in FIG. 2 was used to model the catalyst feed. The solid catalyst component that was used in the experiment was prepared as described in Example 3 of EP 688794.

6.0 kg of said solid catalyst component was suspended in 26.1 kg of Primol 352 oil supplied by ExxonMobil to produce a catalyst slurry containing 18.7% by weight solids.

Altogether 5 days testing period was carried out. The following feed rates were tested: 0.17 kg/h, 0.43 kg/h, 0.87 kg/h, and 1.73 kg/h. Also the temperature range −20° C. to +40° C. was tested. The dynamic viscosity of the oil was thus between 80 and 1150 mPa·s.

As a result the catalyst feed pump worked well with all feed rates and on the mentioned temperature range without any kind of problem or fluctuation.

EXAMPLE 6

The procedure was the same as in Example 5 except that a catalyst component prepared according to EP 491566 was used as the solid catalyst component. Again the feed pump worked well without any problems.

EXAMPLE 7

The procedure was the same as in example 5 except that a silica supported metallocene catalyst prepared according to Example 2 of WO 95/12622 was used as the solid catalyst component. The feed pump worked well without problems.

EXAMPLE 8

A portion of the catalyst slurry prepared according to Example 1 was placed into a closed measurement cell made of glass and having a volume of about 200 ml and a diameter of 35 mm, where the settling velocity was measured as follows. About 100 ml of the suspension was taken into the cell and mixed by shaking, after which it was allowed to stand. The level of the catalyst free zone at the surface of the suspension was monitored visually as a function of time. It was found that the depth of the catalyst free zone increased by 10 mm/h. After 100 hours the catalyst had formed sediment at the bottom, which could only be broken by vigorous shaking.

EXAMPLE 9

A slurry prepared according to Example 1 was prepared, except a drag reducing agent NECADD 447™, supplied by M-I Production Chemicals, was added to the composition, corresponding to an amount of 25 parts per million (ppm) in oil. The measurement was conducted as described in Example 8. No catalyst free zone could be observed at the surface of the suspension and no sediment was formed at the bottom.

The invention claimed is:

1. A process for producing olefin polymers, said process comprising the steps of:
    (i) forming in a catalyst feed vessel catalyst slurry comprising oil and a solid catalyst component;
    (ii) maintaining the catalyst slurry in the catalyst feed vessel in a homogeneous state;
    (iii) continuously withdrawing a portion of the catalyst slurry from the catalyst feed vessel and introducing the withdrawn portion of the catalyst slurry into a polymerization reactor;
    (iv) continuously introducing at least one olefin monomer into the polymerization reactor;
    (v) optionally, continuously introducing diluent and/or hydrogen into the polymerization reactor;
    (vi) operating the polymerization reactor in such conditions that the at least one olefin monomer is polymerized by the polymerization catalyst to form a reaction mixture containing the catalyst, unreacted monomer(s), formed polymer and optionally diluent and/or hydrogen;
    (vii) withdrawing a portion of the reaction mixture from the polymerization reactor, characterized in that the oil has a dynamic viscosity of from 30 to 990 mPa·s at the conditions within the catalyst feed vessel and the catalyst slurry is transferred by using a valveless piston pump from the catalyst feed vessel into the polymerization reactor.

2. The process according to claim 1, wherein the polymerization is conducted in a loop reactor.

3. A process for producing olefin polymers, said process comprising the steps of:
   (i) forming in a catalyst feed vessel catalyst slurry comprising oil, a solid catalyst component, and a drag reducing agent;
   (ii) maintaining the catalyst slurry in the catalyst feed vessel in a homogeneous state;
   (iii) continuously withdrawing a portion of the catalyst slurry from the catalyst feed vessel and introducing the withdrawn portion of the catalyst slurry into a polymerization reactor;
   (iv) continuously introducing at least one olefin monomer into the polymerization reactor;
   (v) optionally, continuously introducing diluent and/or hydrogen into the polymerization reactor;
   (vi) operating the polymerization reactor in such conditions that the at least one olefin monomer is polymerized by the polymerization catalyst to form a reaction mixture containing the catalyst, unreacted monomer(s), formed polymer and optionally diluent and/or hydrogen; and
   (vii) withdrawing a portion of the reaction mixture from the polymerization reactor, characterized in that the oil has a dynamic viscosity of from 20 to 1500 mPa·s at the conditions within the catalyst feed vessel and the catalyst slurry is transferred by using a valveless piston pump from the catalyst feed vessel into the polymerization reactor;
   wherein the drag reducing agent is a polymer of one or more $C_6$ to $C_{15}$ alpha-olefins, and the drag reducing agent is present in an amount of 0.1 to 1000 parts per million by weight of the catalyst slurry.

4. The process according to claim 1, wherein the reaction mixture is passed through a concentration device after it has been withdrawn from the reactor.

5. The process according to claim 1, wherein the reaction mixture, is withdrawn continuously.

6. A process for producing olefin polymers, said process comprising the steps of:
   (i) forming in a catalyst feed vessel catalyst slurry comprising oil and a solid catalyst component;
   (ii) maintaining the catalyst slurry in the catalyst feed vessel in a homogeneous state;
   (iii) continuously withdrawing a portion of the catalyst slurry from the catalyst feed vessel and introducing the withdrawn portion of the catalyst slurry into a polymerization reactor;
   (iv) continuously introducing at least one olefin monomer into the polymerization reactor;
   (v) optionally, continuously introducing diluent and/or hydrogen into the polymerization reactor;
   (vi) operating the polymerization reactor in such conditions that the at least one olefin monomer is polymerized by the polymerization catalyst to form a reaction mixture containing the catalyst, unreacted monomer(s), formed polymer and optionally diluent and/or hydrogen;
   (vii) withdrawing a portion of the reaction mixture from the polymerization reactor, characterized in that the oil has a dynamic viscosity of from 20 to 1500 mPa·s at the conditions within the catalyst feed vessel and the catalyst slurry is transferred by using a valveless piston pump from the catalyst feed vessel into the polymerization reactor and the catalyst slurry further comprises a drag reducing agent, which is a polymer of one or more $C_6$ to $C_{15}$ alpha-olefins.

7. A process for producing olefin polymers, said process comprising the steps of:
   (i) forming in a catalyst feed vessel catalyst slurry comprising oil and a solid catalyst component;
   (ii) maintaining the catalyst slurry in the catalyst feed vessel in a homogeneous state;
   (iii) continuously withdrawing a portion of the catalyst slurry from the catalyst feed vessel and introducing the withdrawn portion of the catalyst slurry into a polymerization reactor;
   (iv) continuously introducing at least one olefin monomer into the polymerization reactor;
   (v) optionally, continuously introducing diluent and/or hydrogen into the polymerization reactor;
   (vi) operating the polymerization reactor in such conditions that the at least one olefin monomer is polymerized by the polymerization catalyst to form a reaction mixture containing the catalyst, unreacted monomer(s), formed polymer and optionally diluent and/or hydrogen;
   (vii) withdrawing a portion of the reaction mixture from the polymerization reactor, characterized in that the oil has a dynamic viscosity of from 30 to 990 mPa·s at the conditions within the catalyst feed vessel and the catalyst slurry is transferred by using a valveless piston pump from the catalyst feed vessel into the polymerization reactor and the catalyst slurry is contacted with one or more coactivator in a static mixer before introduction into the polymerization reactor.

8. The process according to claim 7, wherein at least one coactivator is a trialkylaluminium.

9. The process according to claim 7, wherein the catalyst system comprising the coactivator and the solid catalyst component has productivity of at least 3 kg polymer/g.

10. A composition comprising
   (i) from 10 to 30% by weight of the total composition, a solid catalyst component;
   (ii) from about 70 to about 90% by weight of the total composition, an oil having a viscosity of 20 to 1500 mPa·s; and
   (iii) from 0.1 to 1000 part per million, based on the night of the total composition, a drag reducing agent, dissolved in said oil, which drag reducing agent is either a polymer comprising a majority of units derived from $C_6$ to $C_{15}$ alpha-olefins and/or an olefin polymer having an inherent viscosity of at least 10 dl/g.

11. The composition according to claim 10, wherein the composition comprises from 0.5 to 100 parts per million by night of the drag reducing agent.

12. The composition according to claim 10, wherein the drag reducing agent has a night average molecular night of at least 250000 g/mol.

* * * * *